United States Patent [19]

Hickey

[11] 4,443,934
[45] Apr. 24, 1984

[54] METHOD OF ASSEMBLING PERMANENT MAGNET DC MACHINES

[75] Inventor: John S. Hickey, Burnt Hills, N.Y.

[73] Assignee: General Electric Company, Schenectady, N.Y.

[21] Appl. No.: 432,612

[22] Filed: Oct. 4, 1982

[51] Int. Cl.$^3$ ............................................. H02K 15/16
[52] U.S. Cl. ........................................ 29/593; 29/596; 29/732
[58] Field of Search .......................... 29/596, 593, 732; 310/42, 43, 254, 259

[56] References Cited

U.S. PATENT DOCUMENTS

| 3,401,282 | 9/1968 | Zagorski | 310/42 |
| 3,422,295 | 1/1969 | Parker | 29/596 X |
| 3,889,360 | 6/1975 | Meili | 29/593 |
| 4,128,935 | 12/1978 | Czech et al. | 29/596 |

Primary Examiner—Carl E. Hall
Attorney, Agent, or Firm—William H. Steinberg; James C. Davis, Jr.; Marvin Snyder

[57] ABSTRACT

A method of assembling a dc permanent magnet machine using a high permeability epoxy iron mixture to join magnets and flux guides. The epoxy iron mixture serves as an adjustable spacer. The epoxy iron mixture which can be half iron powder and half epoxy by volume, is situated between the magnets and the flux guides and the rotor inductance is measured while compressing the machine in a fixture until a predetermined value of rotor inductance is achieved.

6 Claims, 8 Drawing Figures

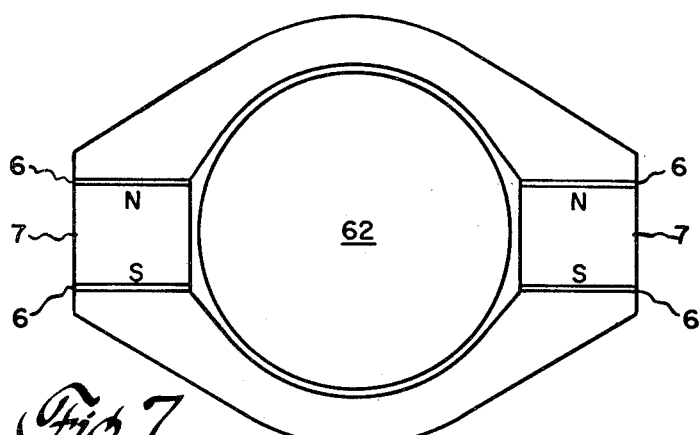
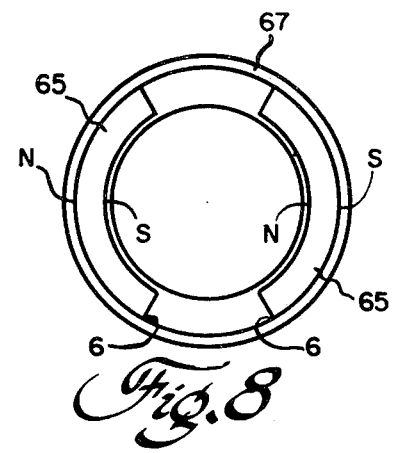
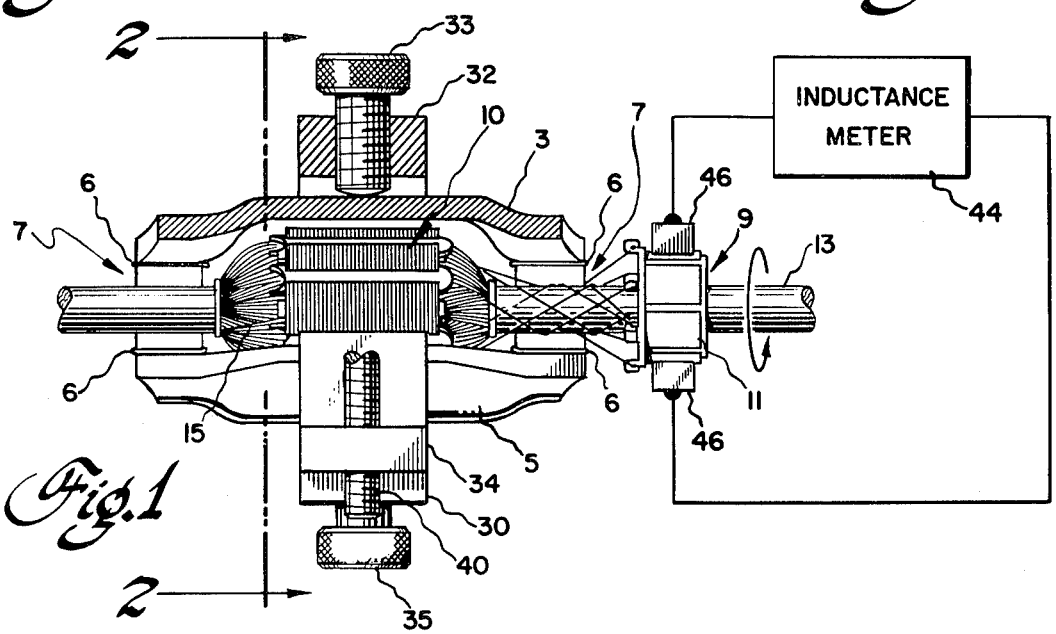
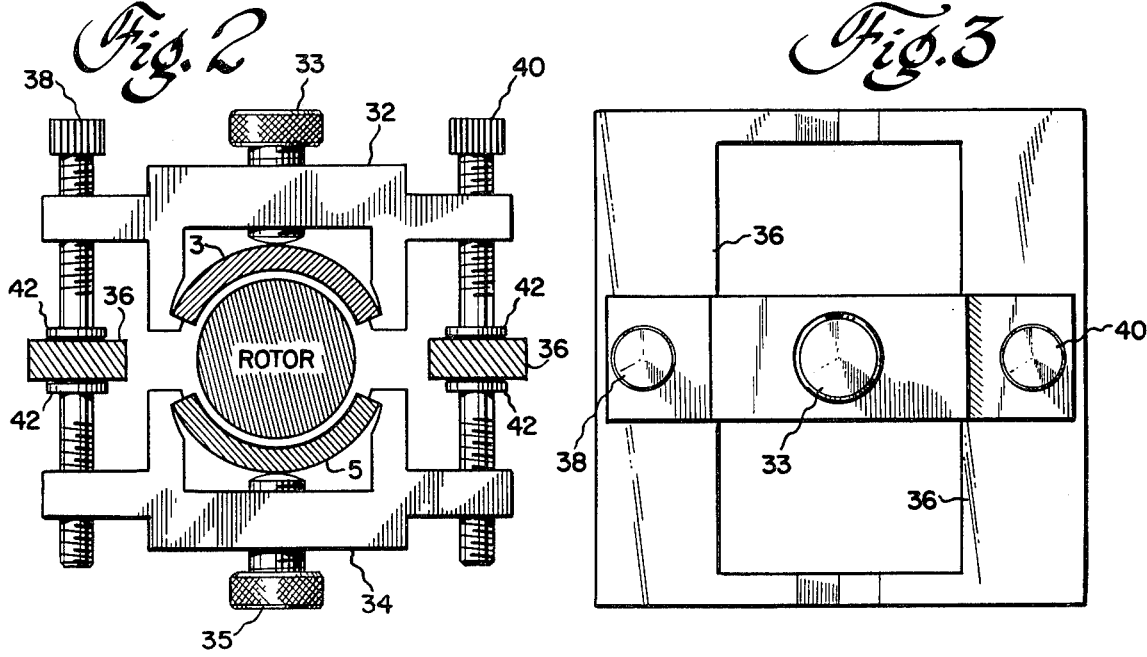

METHOD OF ASSEMBLING PERMANENT MAGNET DC MACHINES

CROSS-REFERENCES TO RELATED APPLICATIONS

This application is related to my copending application Ser. No. 432,613, filed concurrently herewith and assigned to the same assignee as the present invention.

BACKGROUND OF THE INVENTION

This invention relates to methods of assembling rotating machines and more particularly methods of assembling permanent magnet dc machines to obtain accurately set rotor air gaps.

When assembling permanent magnet dc machines it is important that the rotor air gap be accurately set. However, when motors or generators are made in large quantities it is desirable to have generous tolerances on individual parts. It is not desirable to have these tolerances result in large variations in rotor air gap size from machine to machine.

Fine adjustment of air gap size by deformation of the pole pieces which serve as flux guides is not practical since the pole pieces have to be massive to carry sufficient magnetic flux. To allow compensation for the situation in which the air gap in a machine is not accurately set, it is necessary to provide sufficient magnetic material and copper windings for the worst case so that minimum operating specifications can be met. A larger than desired air gap would require additional magnet material and copper windings to achieve the same performance as a machine with a properly set air gap.

It is an object of the present invention to provide a method for adjusting for tolerances individual machine parts of dc permanent magnet machines during assembly, to achieve accurately set rotor air gaps.

It is another object of the present invention to reduce the magnet material and copper needed in manufacturing a dc permanent magnet motor of a given rating.

SUMMARY OF THE INVENTION

Briefly, in accordance with a preferred embodiment of the present invention, a method of assembling a dc permanent magnet machine comprises the steps of situating a layer of curable flux conductive spacer material between at least one magnet and at least one of its associated pole pieces. Next the rotor is positioned in the stator, equidistant from the stator in the radial direction. The rotor inductance, at the brushes which are in contact with the commutator of the rotor, is measured while applying pressure to the pole pieces, moving the pole pieces toward one another compressing the spacer material. The rotor is kept equidistant in the radial direction from the stator while applying pressure. Further pressure application ceases when a predetermined value of inductance is measured.

BRIEF DESCRIPTION OF THE DRAWING

While the specification concludes with claims particularly pointing out and distinctly claiming the present invention, the objects and advantages of the invention can be more readily ascertained by the following description of a preferred embodiment when used in conjunction with the accompanying drawings in which:

FIG. 1 is a cut-away side view of a permanent magnet dc machine with a fixture for adjusting the rotor air gap by measuring the rotor inductance;

FIG. 2 is a transverse sectional view along the line 2—2 of FIG. 1;

FIG. 3 is top view of the fixture of FIG. 1;

FIG. 7 is a transverse sectional view of a dc permanent magnet wing motor which can be assembled in accordance with the present invention; and FIG. 8 is a transverse sectional view of a dc permanent motor using arcuate shaped magnets which can be assembled in accordance with the present invention.

DETAILED DESCRIPTION OF THE INVENTION

Figure 4:
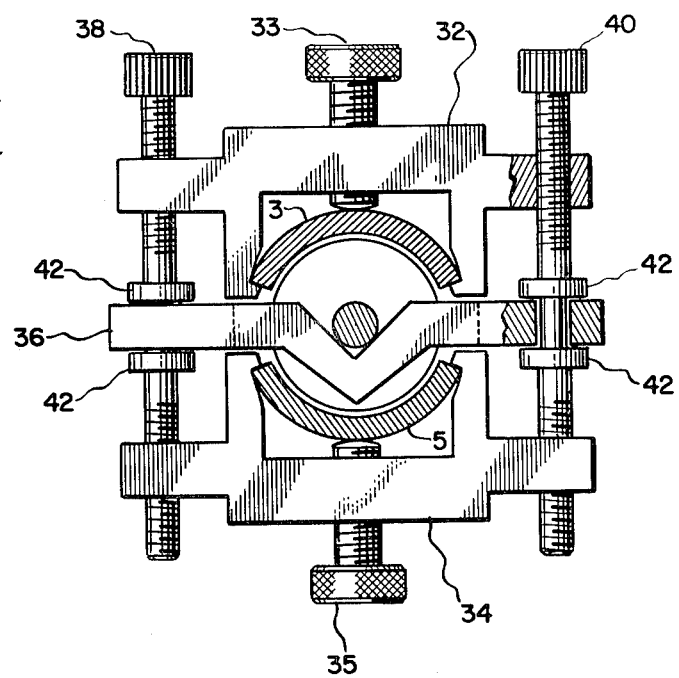
FIG. 4 is a transverse sectional view of FIG. 1, showing a means of holding the rotor centered while adjusting the airgap.

Referring now to the drawings wherein like numerals refer to like elements throughout, and particularly to FIG. 1, a dc permanent magnet machine 1 is shown having a north pole piece 3 and a south pole piece 5. A thin layer of spacer material 6 having a high relative permeability (over 10) such as an epoxy iron mixture is situated between magnets 7 and the north and south pole pieces 3 and 5, respectively. The magnets 7 separate the pole pieces which are positioned above and below a rotor 9. The rotor has an armature core 10 and extended commutator 11 mounted on a shaft 13. An armature coil winding 15 is wound about the core with the coil ends terminating in the appropriate segments of the commutator 11.

The spacer material can be a mixture of approximately half iron powder and half epoxy by volume. The epoxy can be diglycetal ether of bisphenol A or an epoxide with an equivalent weight in the range substantially of 180 to 195. Such an epoxy is Shell 828 manufactured by the Shell Oil Co.

A jig or fixture 30 is positioned about the central cylindrical portion of the machine 1. The fixture 30 is capable of moving pole pieces relative to one another while maintaining the rotor centered in the radial direction between the pole pieces 3 and 5, respectively. The fixture has three sections, an upper section 32, clamped by a bolt 33 to the north pole piece, a lower section 34 clamped to the south pole piece by a bolt 35 and a central section 36 visible in FIG. 2, having "V" shaped notches in which the ends of the rotor shaft rests. The relative motion of the upper and lower sections away and towards one another while keeping the central portion equidistant from the upper and lower sections is accomplished by rotating bolts 38 and 40, visible in FIG. 2, which are located on the fixture on either side of the machine. The portions of bolts 38 and 40 threaded through the upper sections 32 have right hand threads, the portions of bolts 38 and 40 threaded through the lower section 34 have left hand threads and the portions of the bolts 33 and 35 passing through the central section are fixed in the longitudinal direction to the central section during bolt rotation by collars 42.

An inductance meter 44, such as an induction bridge, is connected to the rotor through brushes 46 mounted on the rotor commutator 11, as shown in FIG. 1, to measure the inductance of the motor windings, which is a function of the air gap between the rotor and the pole pieces.

The dc permanent magnet machine which is assembled with the layer of curable spacer material between the magnets 7 and the pole pieces 3 and 5 is placed in the fixture 30. The bolts 38 and 40 are turned in a clockwise direction when viewed from above, moving the pole pieces closer together and compressing the spacer material until a predetermined value of inductance is measured. The spacing between the pole pieces is then held while the spacer material is cured. The fixture 30 insures that the rotor mechanical clearances are adequate since the inductance is a function of the average air gap.

It is desirable for the spacer material, in addition to having a magnetic permeability of over 10, to set up in a reasonable time to a firm structural element. An epoxy which can be cured to the "B" stage, wherein the consistency of the mixture is that of a gum, can be cut from a sheet and used in the assembly process. The epoxy Shell 828 described previously herein can be mixed in substantially equal amounts with iron power and cured to the "B" stage. Heating of the iron epoxy mixture while in the B stage in an oven, for example, would achieve the cure.

The iron epoxy mixture can be used to bond the pole pieces 3 and 5 to the magnet 7 or, if that is not desirable, one of the members (either pole pieces or magnets) can be coated with a mold release, such as silicon, to prevent bonding. The cured epoxy iron mixture then becomes a firm mechanical shim of the right thickness.

After the air gap is set by compressing the epoxy iron mixture and the epoxy iron mixture has cured, the rotor can be mounted in bearings (not shown) and the magnets magnetized by placing the machine in a magnetic field.

Figure 5:
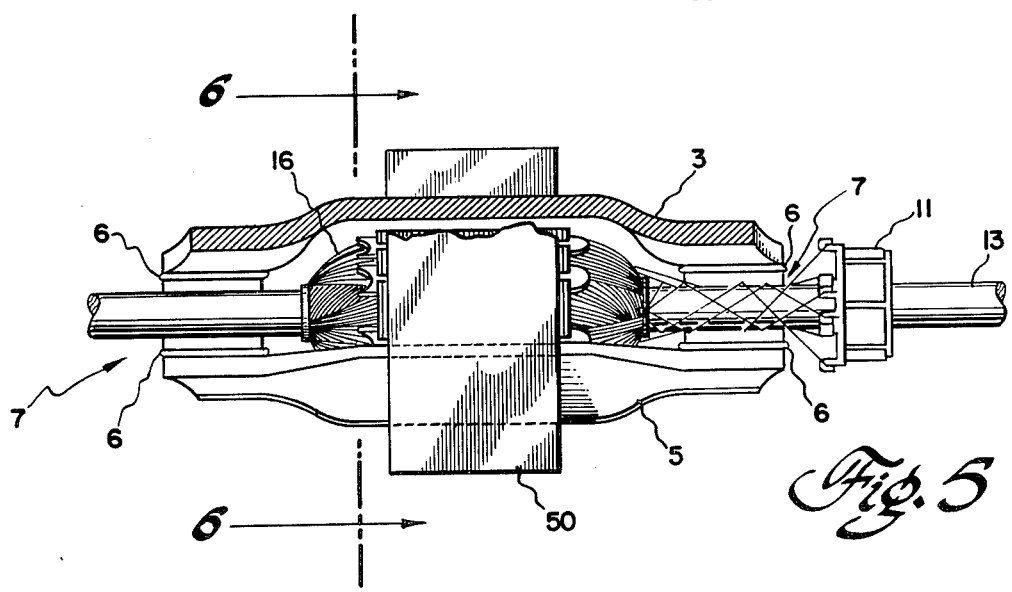
FIG. 5 is a cut-away side view of a permanent magnet machine with a fixture for setting air gap by controlling the distance between the pole pieces.
Figure 6:
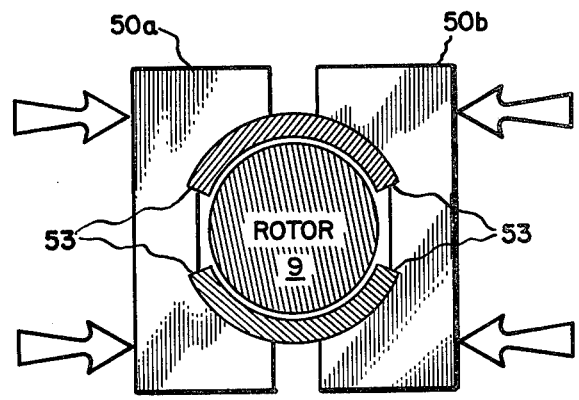
FIG. 6 is a transverse vertical sectional view along the lines 6—6 of FIG. 5.

Another embodiment of the present invention is shown in FIGS. 5 and 6. FIG. 5 shows a fixture 50 placed about the central portion of the machine. The machine has flux conductive spacer material 6 between the north and south pole pieces 3 and 5, respectively, and the magnets 7 as in FIG. 1. In FIG. 6 the fixture 50 can be seen to have two identical halves 50a and 50b. Each half has a recess for receiving a section of the exterior surfaces of the north and south pole pieces and a section of the edges of the north and south pole pieces. As the two halves 50a and 50b are forced towards one another about the center of the machine (the arrows in FIG. 6 show the direction of the applied force) the north and south pole pieces are forced toward one another until the edges of the central arcuate shaped north and south pole pieces seat in notches 53 in halves 50a and 50b. The forcing together of the fixture halves moves the pole pieces closer together and compresses the spacer material between the pole pieces and the magnet. The recesses in the fixture and the notches are positioned so that a rotor placed in the stator would have the desired air gap dimensions when the fixture is compressed about the machine to seat the edges of the pole pieces in the notches. As discussed in connection with FIGS. 2-4, the epoxy iron spacer material can first be cured to the "B" stage to simplify placement of the spacer material and control its curing.

FIG. 7 shows a transverse section of a wing-type dc permanent magnet machine. In this type of machine the magnets 7 are located in a radial direction from the armature of a rotor 62. Spacer material 6 is situated between the pole pieces and the magnets 7. The rotor 62 of the mahcine has an armature winding wound on an armature core with the winding ends attached to a commutator (not shown). Suitable fixtures can be used as in FIGS. 1-6 to compress the spacer material to achieve the desired air gap.

Another type of dc permanent magnet machine is shown in FIG. 8. Arcuate-shaped magnets 65 are mounted to the cylindrical yoke 67 or frame, with spacer material 6 between the yoke and the magnets 65. The magnets are positioned in a radial direction from the armature of the rotor. The rotor has an armature winding wound on the armature core with the winding ends attached to a commutator not shown. Suitable fixtures of the type shown in FIGS. 1-6 can be used to compress the spacer material to achieve the desired air gap.

The foregoing describes a method of adjusting for tolerances individual machine parts of a dc permanent magnet machine during assembly to achieve accurately set rotor air gaps and minimize the required copper and magnetic material needed in manufacturing such machines of a given rating.

While the invention has been particularly shown and described with reference to several preferred embodiments thereof, it will be understood by those skilled in the art that various changes in form and details may be made therein without departing from the spirit and scope of the invention.

What is claimed is:

1. A method of assembling a dc permanent magnet machine comprising the steps of:
   situating a layer of curable flux conductive spacer material between at least one magnet and at least one of two pole pieces associated with the magnet in the stator of the machine;
   positioning a rotor in the stator equidistant in the radial direction from the stator;
   applying pressure to the pole pieces to move the pole pieces towards one another compressing the spacer material, while keeping the rotor equidistant from the stator;
   measuring the rotor inductance while applying pressure to the pole pieces; and
   removing pressure from the pole pieces when a predetermined value of rotor inductance is reached, thereby achieving the desired rotor air gap.

2. The method of claim 1 wherein said curable flux conductive spacer material has a relative permeability over 10.

3. The method of claim 1 wherein said curable flux conductive spacer material comprises a mixture of iron powder and epoxy in substantially equal amounts by volume.

4. The method of claim 3 wherein said epoxy comprises an epoxide with an equivalent weight in the range substantially of 180 to 195.

5. The method of claim 3 wherein said epoxy comprises a diglycetal ether of bisphenol A.

6. The method of claim 5 including the preliminary steps of partially curing the iron-epoxy mixture to the "B" stage, forming the partially-cured mixture into a sheet, and cutting the spacer material from the sheet for placing between the magnet and the associated pole piece.

* * * * *